Jan. 18, 1966    K. BREER ET AL    3,229,962
MIXING APPARATUS
Filed Jan. 10, 1962
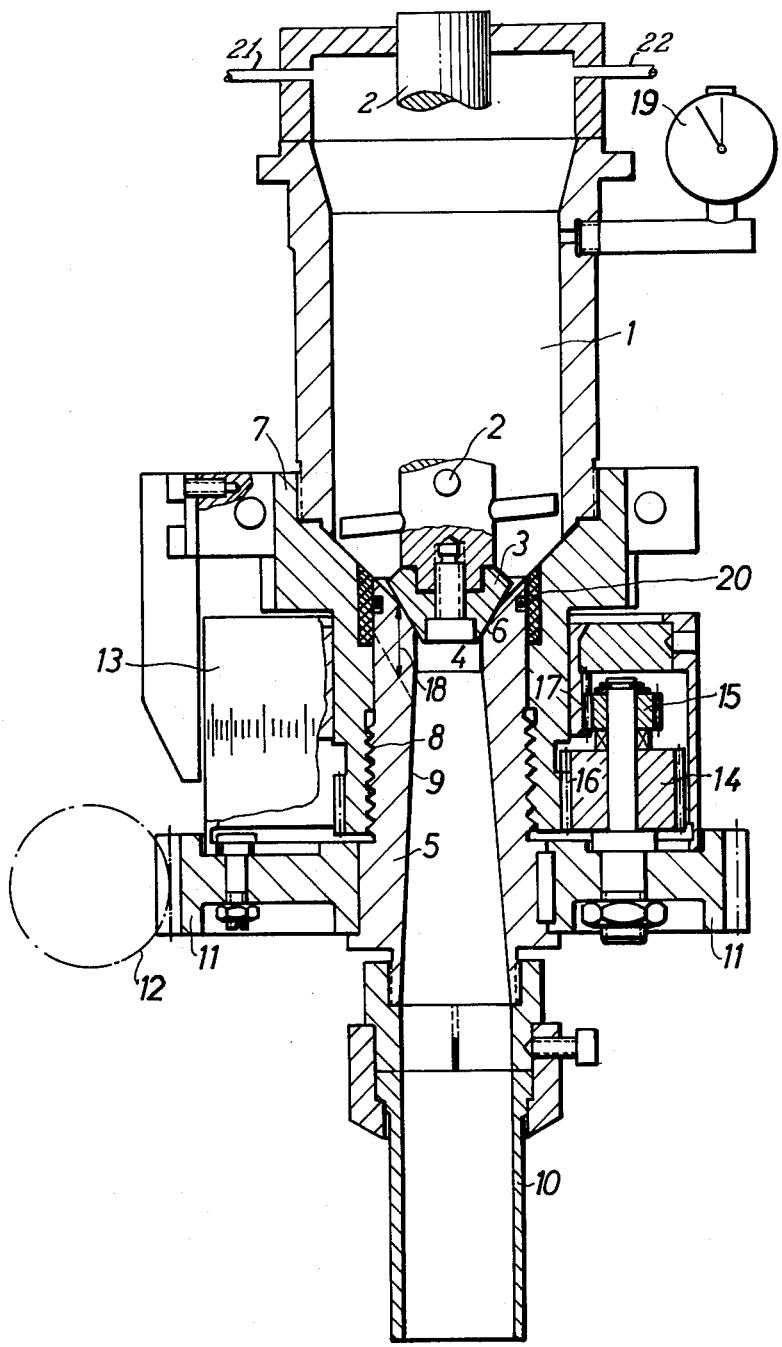
INVENTORS:
KARL BREER, HEINZ KISTENEICH.
BY *Clelle W. Upchurch*
ATTORNEY

United States Patent Office

3,229,962
Patented Jan. 18, 1966

3,229,962
MIXING APPARATUS
Karl Breer, Leverkusen, and Heinz Kisteneich, Troisdorf, Germany, assignors of one-half to Farbenfabriken Bayer Aktiengesellschaft, Leverkusen, Germany, a corporation of Germany, and one-half to Maschinenfabrik Karl Hennecke, Birlinghoven, Siegkreis, Germany, a corporation of Germany
Filed Jan. 10, 1962, Ser. No. 165,452
Claims priority, application Germany, Jan. 17, 1961, F 32,983
6 Claims. (Cl. 259—7)

This invention relates to a mixing apparatus for the intimate mixing of chemically reactive components and, more particularly, to a mixing apparatus for cellular polyurethane plastics which is capable of continuously varying the cell size of the cellular product.

It has been heretofore known to form cellular polyurethane products utilizing a stirrer type mixing device into which the low viscosity reactants are injected by means of suitable pumps and high pressure nozzles into a continuous stream of the polyhydroxy compounds which generally have a higher viscosity. After being thoroughly mixed, the reaction mixture is discharged from this mixing device into a suitable container where foaming takes place, resulting in the desired cellular product. The variation in size of the discharge opening influences the dynamic pressure within the mixing device. This pressure, which is commonly referred to as back pressure, determines the pore size of the cellular product.

It has been heretofore known to alter the size of the discharge outlet of such mixing devices and thus regulate the cell size in the finished cellular product. One such device utilizes a two-section mixing device where the bottom of the device screws up and down on the top section and thus varies the size of the discharge outlet by altering the relation between the free end of the agitator and the discharge opening. While this structure operates satisfactorily, it suffers from several disadvantages including the formation of leaks in the mixing chamber between the two portions which move relative to each other, thus making it more difficult to control the dynamic pressure and also as the device is continually used, it becomes increasingly more difficult to move the entire bottom section. This is true for the reason that the reaction components find their way to the threaded section where solidification occurs. Secondly, an apparatus of this type must be specially manufactured to provide for the changeability of the discharge outlet.

It is generally desired to produce cellular polyurethanes in large blocks. This is accomplished by moving the mixing chamber backwards and forwards transversely over a conveyor belt. This continuous movement makes it difficult to manually control the size of the discharge opening by a screw positioned on the moving mixing chamber itself and thus the opening of the discharge outlet is not adjusted as precisely as desired. Further, the continuous movement of the mixing apparatus transversely over the conveyor presents a danger to the operator who attempts to make adjustments in the size of the discharge opening while the apparatus is in operation.

It is, therefore, an object of this invention to provide a mixing apparatus having a readily adjustable discharge opening. It is another object of this invention to provide a mixing apparatus for the preparation of cellular polyurethane plastics having a predetermined cell size. It is still another object of this invention to provide an improved variable sized discharge outlet for mixing apparatuses useful in the preparation of cellular polyurethane plastics. It is a further object of this invention to provide a variable size discharge outlet for mixing apparatuses which can be readily adapted to the conventional type device without replacing the entire unit.

These and other objects will become apparent from the drawing which illustrates one embodiment in accordance with this invention.

The foregoing objects and others which will become apparent from the following description are accomplished in accordance with this invention, generally speaking, by providing an improved apparatus for the preparation of cellular polyurethane plastics having a predetermined cell size wherein the mixing apparatus is provided with a guide sleeve member at the discharge end of the mixing apparatus which forms a tubular-like opening in axial alignment with the mixing chamber and with an agitator rotatably disposed within the mixing chamber. Within the guide sleeve member is disposed a valve seat member which moves with relation to both the guide sleeve member and the end of the agitator. This valve seat member is provided with a valve seating surface which cooperates with the end of the agitator to vary the size of the discharge outlet when the valve seat member is moved longitudinally with respect to both the guide sleeve member and the agitator. The guide sleeve member and the valve seat member are provided with means which cooperate with each other to move the valve seat member longitudinally and thus vary the distance between the end of the agitator and the valve seating surface. The valve seat member also has the construction of a nozzle member, that is, the internal wall of the valve seat member below the valve seating surface gradually increases in diameter to form a conical-like conduit. This construction prevents splashing of the reaction mixture in the receptacle into which the mixture is discharged.

The end of the agitator may be any configuration which will cooperate with the valve seating surface of the valve seat member to constrict the flow of the reaction mixture to thereby vary the back pressure within the mixing device. The end of the agitator may simply be cylindrical, hemispherical, frusto-conical, or it may even carry a detachable member which has a configuration complementary to the valve seating surface. The mixing chamber is also provided with a contact manometer which indicates the dynamic pressure within the chamber.

The valve seat member is telescoped within the guide sleeve member and moves longitudinally therewith. Any suitable means of moving the valve seat member with respect to the guide sleeve member may be used such as a cam following surface provided on the external wall of the valve seat member which will cooperate with a cam surface provided on the guide sleeve member to cause the longitudinal movement. The valve seat member can then have rigidly fastened thereto a pinion type gear which will turn the valve seat member with respect to the guide sleeve member, thereby causing the engagement of the cam surface with the cam following surface to move the valve seat member. The valve seat member can also be moved with respect to the guide sleeve member by a lever type arrangement wherein the two members will be maintained in the desired position by any suitable means such as, for example, a series of notches provided in one of the members and a protrusion provided in the other.

The invention will be more fully described with relation to the drawing in which a mixing apparatus having inlets 21 and 22 is shown. The mixing chamber 1 has disposed therein in axial alignment therewith an agitator 2 having a free end 3 which is depicted as a valve member having a frusto-conical removable valve disc. A valve seat member 5 is positioned immediately beneath the free end 3 of the agitator 2. This valve seat member 5 has a valve seating surface 6 which is complementary in configuration to the free end 3 of the agitator 2.

In the drawing as shown the valve seat member 5 is in its uppermost position, causing the contact between the valve seating surface 6 and the free end 3. The internal surface of the valve seat member 5 has, in addition to the valve seating surface, a central outlet aperture 4 and a surface 9 which has an increasing diameter in the downward direction to form a frusto-conically shaped conduit. Disposed about the valve seat member 5 is a guide sleeve member 7 which is rigidly fastened to the walls of the mixing chamber 1. This guide sleeve member 7 surrounds the valve seat member 5 and provides a means 8 for moving the valve seat member 5 with respect to both the guide sleeve member 7 and the free end 3 of the agitator 2. The means 8 shown in the drawing is a cam surface provided on the guide sleeve member 7 and a cam following surface provided on the valve seat member 5. This cam type arrangement may be in the form of threads or it may be a helical tongue and groove arrangement or any suitable mechanism which will cause the valve seat member 5 to move longitudinally when turned. A gear wheel 11 is rigidly fastened to the lower portion of the valve seat member 5 and is utilized for the purpose of turning the valve seat member 5 with respect to the guide sleeve member 7. This gear 11 may be turned by any suitable means such as a worm gear 12 illustrated in the drawing. Any suitable means may be used such as, for example, a rack which is positioned parallel to the path of the mixing apparatus as it traverses the path of the conveyor which carries the receptacles for the reaction components of the polyurethane plastic. This rack type gear can be held firmly against the gear 11 as the mixing apparatus travels the length of the rack, thus moving the valve seat member 5 either up or down depending upon the direction of movement of the mixing assembly. It can, therefore, be seen from the drawing that as the valve seat member 5 is turned with respect to the guide sleeve member 7, the discharge opening will vary from a minimum or closed position to a maximum open position indicated by the dotted line and the arrow 18. If it is desired to prevent the outlet from being completely closed, a mechanical stop can be incorporated into the cam arrangement to stop the upward movement of the valve seat member 5 short of the free end 3 of the agitator 2. Also, the valve seat member 5 is provided with an annular sealing means 20 around its external surfaces to prevent any of the reaction mixture from reaching the cam and cam following surfaces 8. An extension pipe 10 is provided at the bottom of the conical conduit 9 to further prevent any splashing which may occur upon the discharge of the mixed reaction components from the device.

The size of the discharge opening is predetermined by an annular scale 13 which is coaxially disposed around the valve seat member 5 and which turns to indicate the size of the opening in response to the turning of the valve seat member 5 through the pinion type gears 14 and 15 attached to the gear 11 which engage teeth 16 and 17 provided on the guide sleeve member 7. As gear 11 is turned, gear 14 revolves about the axis of the mixer and is caused to rotate by contact with teeth 16. This rotation is transmitted to gear 15 which drives the scale 13 through teeth 17. Thus, in the embodiment as shown, the discharge outlet can be altered in size from closed to a maximum by rotation of the valve seat member 5 through 360°.

The dynamic pressure within the mixing chamber 1 is further indicated by a contact manometer 19 attached directly to the mixing chamber. The means for driving the worm gear 12 can be automatically activated for a preselected manometer reading which corresponds to a desired mixing chamber pressure to thereby insure that the completed cellular product will have the desired cell size. This can readily be accomplished at a point remote from the moving mixing apparatus, thus removing any possibility of injury to the operator.

With the device as shown and described herein the regulation of the cell structure of the polyurethane foam, which is being produced, can be quickly and reliably effected during continuous block production without the unavoidable losses of material which heretofore have occurred and also without danger to the operating personnel.

Although the invention has been described in considerable detail for the purpose of illustration, it is to be understood that variations can be made by those skilled in the art without departing from the spirit of the invention and scope of the claims.

We claim:

1. An apparatus for mixing liquids together comprising a chamber, means for introducing liquids into said chamber, means for stirring said liquids disposed within said chamber, exit means for discharging the stirred liquids from said chamber, said exit means comprising an opening in the lower end of said chamber and a sleeve member extending from said opening externally of the chamber, a movable insert means disposed within said sleeve member and longitudinally movable with respect thereto, said insert means comprising a frusto-conically shaped passageway having its smallest cross-section adjacent said chamber, one end of said stirring means being adapted to open and close said passageway in said insert means as said insert means is moved within said sleeve member whereby the space between said end of the stirring means and the wall defining said passageway is varied, means for effecting a seal against liquid flow between said movable insert and the wall of said sleeve member and an actuating means for moving said insert with respect to said sleeve member and said end of said stirring means.

2. A mixing apparatus comprising an inlet section, a stirring section and an outlet section, said inlet section including a plurality of inlets to said stirring section, said stirring section including a chamber portion and an agitator axially disposed within said chamber portion, said outlet section including a guide sleeve member affixed to said chamber portion and forming a tubular opening in said chamber portion coaxial with and adjacent the free end of said agitator, a valve seat member positioned within the tubular opening and longitudinally movable with respect to said guide sleeve member, said valve seat member having an internal wall and an external wall, said external wall being substantially complementary to the internal wall of said guide sleeve member, said internal wall of said valve seat member having a valve seating surface which cooperates with said free end of said agitator to define the size of the outlet and a tapered surface of gradually increasing cross-section, and a means for moving said valve seat member longitudinally.

3. A mixing apparatus comprising an inlet section, a stirring section and an outlet section, said inlet section including a plurality of inlets to said stirring section, said stirring section including a chamber portion and an agitator axially disposed within said chamber portion, said outlet section including a guide sleeve member affixed to said chamber portion and forming a tubular opening in said chamber portion coaxial with and adjacent the free end of said agitator, a valve seat member positioned within the tubular opening and longitudinally movable with respect to said guide sleeve member, said valve seat member having an internal wall and a substantially cylindrical external wall, a cam following surface fixed to said external wall of said valve seat member, a cam surface fixed to the internal wall of said guide sleeve member to contact said cam following surface and move said valve seat member in the longitudinal direction, said internal wall of said valve seat member having a valve seating surface which cooperates with the free end of said agitator to define the size of the outlet and a tapered surface of gradually increasing cross-section, and a means for turning said valve seat member with respect to said guide sleeve member.

4. The apparatus of claim 2 wherein the external wall of the valve seat member is provided with an annular sealing member in intimate sliding contact with the internal wall of the guide sleeve member.

5. The apparatus of claim 3 where a scale connected through gears to the valve seat member is provided which indicates the relative size of the discharge opening in response to rotation of the valve seat member.

6. The apparatus of claim 2 wherein a manometer is connected directly to the chamber to indicate the dynamic pressure therein.

References Cited by the Examiner

UNITED STATES PATENTS

| | | | |
|---|---|---|---|
| 825,178 | 7/1906 | Barnstead | 251—351 X |
| 902,309 | 10/1908 | MacWilliam | 251—346 X |
| 2,764,177 | 9/1956 | Paasche. | |
| 2,777,675 | 1/1957 | Stelzer et al. | |
| 2,957,203 | 10/1960 | Marshall | 259—7 X |
| 3,005,624 | 10/1961 | Hoppe et al. | 259—8 |

WALTER A. SCHEEL, *Primary Examiner.*

CHARLES A. WILLMUTH, *Examiner.*